United States Patent [19]
Maruta, deceased et al.

[11] 3,762,987
[45] Oct. 2, 1973

[54] WATER-SOLUBILIZED POLYVINYL ADHESIVE METHOD

[75] Inventors: Iwao Maruta, deceased, Funabashi-shi, Chiba, Japan; by Kiyoko Maruta; by Yoshi Maruta, both of Chiba, Japan legal representatives; Haruhiko Arai, Urawa-shi; Shoji Horin Chiba, both of Japan

[73] Assignee: Kao Soap Co., Ltd., Tokyo, Japan

[22] Filed: Apr. 20, 1971

[21] Appl. No.: 135,692

Related U.S. Application Data

[63] Continuation-in-part of Ser. No. 837,341, June 27, 1969, abandoned.

[52] U.S. Cl............... 161/251, 156/247, 156/307, 156/332, 161/256, 161/410, 260/29.6 BE, 260/29.6 Z, 260/29.6 PM
[51] Int. Cl...................... B32b 27/10, B32b 31/12
[58] Field of Search................... 156/247, 307, 332; 161/251, 256, 410; 260/23 AC, 29.6 H, 29.6 MM, 29.6 PM, 29.6 R, 29.6 BE, 29.6 Z

[56] References Cited
UNITED STATES PATENTS
3,536,563  10/1970  Brandts et al...................... 156/246
3,563,942  2/1971  Heiberger.......................... 260/29.2

FOREIGN PATENTS OR APPLICATIONS
894,855  4/1962  Great Britain

Primary Examiner—Alfred L. Leavitt
Assistant Examiner—Robert A. Dawson
Attorney—Woodhams, Blanchard & Flynn

[57] ABSTRACT

Materials are adhesively attached to each other by applying therebetween in bonding relationship a moisture sensitive water-solubilized water-insoluble high moecular weight polyvinyl compound, thus to produce a novel bonded article exhibiting strong cohesiveness in the dry state and significantly reduced cohesiveness in the wet state, thus permitting said materials to be separated upon moistening.

9 Claims, No Drawings

WATER-SOLUBILIZED POLYVINYL ADHESIVE METHOD

CROSS REFERENCE TO RELATED CASE

This is a continuation-in-part of application Ser. No. 837,341, filed June 27, 1969, and now abandoned.

BACKGROUND OF THE INVENTION

This invention relates to a process of adhesively bonding materials using a polyvinyl adhesive which has significantly different adhesive properties in the dry and wet states.

The art of bonding and adhesives includes areas of application where bonded objects are required to exhibit significant differences in cohesiveness in the dry state compared with the wet state. An example of this is the article of commerce, papered tile, which is composed of a number of ceramic tile pieces arranged in the intended final pattern on a sheet of paper or other kind of sheet material and bonded to the sheet so as to be retained in the pattern throughout the necessary handling operations including application of the sheet of tiles to the wall or floor base. The advantages of the use of such an article are well-recognized, especially in the saving of labor and time and the retention of the intended tile pattern in the finished structure. After solidification of the cement or mortar holding the tile to the wall or floor, the sheet must be removed, and this is commonly done by wetting to develop a reduction in adhesiveness in the wet state.

The adhesive used for the above purpose is one which must provide a good initial bonding strength, a strong bond in the dry state so as to preserve the papered tile article during handling in transportation and application, but must also provide a reduction in bond strength when wetted in order to permit clean removal of the sheet.

There are a wide variety of examples in this general area of application, including stamps, labels, gummed tapes, mosaic tiles, decals, wallpapers, and a variety of wettable laminations, and the invention is addressed to such objects that are coated with the adhesive coating of this invention and are adapted to receive in bonding relationship complementary objects adhesively attached thereto so as to constitute the novel articles of this invention; and to the method of forming the bonded article and methods of separating the objects from each other by reducing the strength of the formed bond by applying moisture thereto.

A variety of adhesives have been used for the noted general purposes, most being limitation the remoistening type such as starch and dextrins, but these are notorious in their tendency to undergo bacterial and photo-induced degradation. This prior kind of adhesive, when used to bond dense or heavy objects such as ceramic or metal pieces to sheet material, also does not possess the required adhesive strength to permit transportation and handling of such bonded articles, as for example papered tiles. Other adhesives have been used such as carboxymethylcellulose, sodium alginate, and similar polysaccharide compounds. These prior adhesives have limited application in the field of this invention because of their low bonding strength before complete drying after initial adhesive attachment, when this step is carried out with a moistened bonding material, i.e., their initial bonding strength is low. Since the adhesive attachment between the objects forming the novel bonded articles of this invention is often most conveniently carried out with a moistened bonding material, this lamitation is a serious one. Another disadvantage characterizing the prior polysaccharide adhesives is that many do not possess sufficiently high bonding strength after drying.

Protein base adhesives such as animal glue or casein, and polyvinyl alcohol (PVA), polyvinyl acetate (PVAc), vinyl acetate-maleic anhydride copolymers, and similar synthetic high molecular weight compounds, when they are used in a bonded article comprised of dense or heavy objects exhibit unacceptably small difference in bonding strength between the dry state and the wet state, and hence exhibit excessive resistance to separating on moistening. PVA in a composition with alkali alkylsulfate has been suggested as an adhesive for gummed tape. This adhesive material, however, possesses too low bonding strength in the dry state for use with dense or heavy objects. Strippable, i.e. not adhesively disposed, protective coatings have been suggested comprising polyvinyl acetals which are applied as dispersions in aqueous solutions of anion-active emulsifying agents such as sodium oleate. In this strippable protective coating art, the conditions of dispersion and the ingredients, such as the amount of emulsifier, must be carefully controlled to avoid the coatings being affected by water, because the property of water-sensitivity is highly undesirable, and any significant degree of modification of the film upon contact with water renders it unsuitable as such a protective coating.

SUMMARY OF THE INVENTION

This invention provides an article of manufacture comprising complementary objects adhesively attached together thereto so as to constitute a novel bonded article; to methods of forming the novel bonded article; and to methods of separating the complementary objects from each other by reducing the strength of the formed bond by applying moisture to the bonding material.

One of the objects, adapted to receive the other object in such bonding relationship, can include, for example, stamps, labels, gummed tapes, mosaic tiles of plastic, ceramic, wooden or metallic structure, wall papers, posters, decals, wet laminations and the like.

The objects in final bonding relationship can be composed of such pairs of complementary materials as paper and plastic, paper and wood, paper and paper, paper and fibers, cloth and metal, paper and ceramic, cloth and plastic and the like to make up a complementary pair of materials bonded together temporarily so as to preserve arrangement of component parts during handling and permanent affixation.

It is desirable that one of the objects composing the complementary pair of materials be of moisture pervious material, preferably in sheet form, such as paper, hydrophilic textiles, non-woven fabrics, water pervious plastic sheets, and the like. The object initially coated, i.e. the object adapted to receive the other complementary object in bonded relationship, for sake of convenience will preferably be this moisture pervious material.

The novel article of manufacture of this invention comprises two objects adhesively bonded to each other by a moisture sensitive bonding composition, at least one object being composed of moisture permeable sheet material and said bonding composition consisting of one part by weight of water-insoluble high molecular weight polyvinyl adhesive compound and 0.1 to 10 parts by weight of anionic surface active agent, the two complementary objects of said article being adapted to be separated from each other by the application of moisture through said moisture permeable sheet material whereby the bonding strength of said moisture sensitive composition is reduced.

The amount of water-solubilized water-insoluble high molecular weight polyvinyl adhesive compound that can be used is in the range of 1 to 50 grams, calculated as solids, per square meter of surface area of the object adhesively coated, and hence the bonding film itself is in this range. For example, in case the adhesive is applied in the form of an aqueous solution of a water-insoluble high molecular weight polyvinyl compound, water-solubilized by an anionic surface active agent, the solution being one having a solids content of 20 percent by weight, the amount of solution to be applied is 5 to 250 grams per square meter.

The other complementary object of the novel bonded articles of this invention can comprise a moisture impervious object that is a metal such as stainless steel, aluminum or copper. It can be a plastic such as a natural or synthetic plastic which can further contain fillers; examples being linoleum, natural rubbers, synthetic rubbers, polyethylenes, polystyrenes, polyvinyl chlorides, polyesters, acrylic resins, phenolic resins, melamine resins and the like; and include objects composed of these plastic materials or coated by them. It includes natural and synthetic foamed plastic objects such as foamed rubbers, polystyrene foams and polyurethane foams. Glass objects include glass solids such as plate glass and glass objects such as glass fibers. Ceramic and the like objects include ceramic tile, porcelain objects, enameled objects, concrete or stone articles and the like. Wood objects include veneer boards, hardboards, wooden blocks or shapes and similar wooden materials.

The manner of applying the adhesive composition of this invention can be any of the conventional methods. It is preferably applied as a transparent aqueous solution, and can be brushed, sprayed, or applied mechanically by conventional coating equipment as by rollers, doctor blades, immersing and the like.

After being applied to the object adapted to receive in bonding relationship the complementary object, the former can be applied directly to the latter, and it is in this stage that the high initial bonding strength of the particular adhesive composition characterizing this invention manifests its importance. The coated object, for example, a paper sheet, can be placed in juxtaposition with the complementary material, for example, the space-patterned ceramic tile, when the adhesive coating is not yet dry to achieve adhesion, and the bonded article can thereupon be dried. When dried, the dry strength of the adhesive is manifested and the bonded article is ready to be transported, handled or otherwise subjected to the necessary stresses heretofore noted. When finally affixed permanently as by cementing to a wall or floor, the tile pieces are cleared of the paper sheet by moistening and the peeling off the paper sheet. At this point the characteristic of lowered cohesiveness in the wet state is manifested, permitting clean separation.

Alternatively the initially coated object can be permitted to dry, and the assembly of the novel bonded article accomplished subsequently. This can be done by allowing the initially coated material to dry at room temperature. Depending on the character of the materials involved, drying can be carried out by heating, at which stage the use of mild temperatures in the range of 30° to 50°C. is sufficient and preferred. This can be done without resort to special venting or condensing means because the adhesive composition used in this invention does not comprise volatile organic solvents apt to burn or to be toxic when inhaled.

Assembly of the thus dried, initially coated object with the complementary object in bonded relationship is conveniently carried out by lightly wetting the adhesive coating, as by pressing with a wet sponge or carefully spraying with water. The moistened surface is then pressed against the complementary material, and the assembled article permitted to dry as described above for the initially coated material.

The water-insoluble synthetic high molecular weight polyvinyl compound used in making up the adhesive composition for use in this invention includes PVAc, polyvinyl acetals and their copolymers with other copolymerizable monomers. Thus, in the practice of the present invention, there can be used: PVAc and its partial saponification products, partially acetylated PVA (Ac-PVA), graft copolymers of PVA with vinyl acetate (VAc), copolymers of VAc with a copolymerizable water-soluble monomer such as vinylpyrrolidone or maleic anhydride, or a copolymerizable water-insoluble monomer such as ethyl acrylate and vinyl laurate; and acetalized products of PVA with a lower aliphatic aldehyde, such as formaldehyde, acetaldehyde or butylaldehyde, that is to say, polyvinylacetals (which will be abbreviated as PVAcl hereinafter) such as polyvinylformal, polyvinylacetoacetal and polyvinylbutyral. The PVA used for the manufacture of these acetalized products need not be pure and it can be one containing combined acetic or like acid in the molecules or one prepared by hydrolysing copolymers of VAc with other polymerizable compounds, such as vinylpyrrolidone, maleic anhydride or vinyl laurate.

The degree of polymerization of the above high molecular weight compound should be as high as possible so long as the high molecular weight compound is soluble in a concentrated aqueous solution of an anionic surface active agent. It is preferred that the degree of polymerization of the high molecular weight compound be at least 10 and, more desirably, 100 or more.

The anionic surface active agent for effecting the water-solubilization of the water-insoluble high molecular weight polyvinyl compound can be exemplified by carboxyl-containing surface active agents such as sodium resinate and sodium oleate; alkyl sulfates such as sodium dodecyl sulfate; alkylarylsulfonates such as sodium butylnaphthalenesulfonate and sodium alkylbenzenesulfonates; and alkylsulfonates such as sodium dodecylsulfonate.

The suitable proportion of the high molecular weight compound to the surface active agent in the adhesive composition according to the present invention is usually in the range (in weight ratio) of the former to the latter of from 10 : 100 to 100 : 10.

The preferred method for the preparation of the adhesive composition for use in the present invention comprises adding a predetermined amount of the high molecular weight compound in the form of granules or an emulsion to a concentrated solution of an anionic surface active agent and stirring the resulting mixture at room tempreature or a somewhat elevated temperature.

The adhesive composition according to the present invention thus obtained will exhibit all the strong adhesive property inherent in PVAc or PVAcl in the dry state, but the bonding strength will be lowered significantly when rewetted, probably because the adhesive will exhibit properties similar to that of the original water-solubilized high molecular weight compound when rewetted.

TABLE 1

Compositions of water-solubilized high molecular weight compounds

| Surface active agent used | Amount of high molecular weight compound (wt.%) | Amount of surface active agent (wt.%) |
|---|---|---|
| ABS | 4 | 16 |
| SDS | 6 | 14 |
| BNS | 10 | 15 |
| Sodium resinate | 4 | 16 |
| Sodium oleate | 4 | 16 |

TABLE 2

[Bonding strengths (g) in dry state (D) and in wet state (W)]

| Surface active agents | PVB[1] D | PVB[1] W | PVAcl[2] D | PVAcl[2] W | PVF[3] D | PVF[3] W | PVAc[4] D | PVAc[4] W | Ac-PVA(87)[5] D | Ac-PVA(87)[5] W | Ac-PVA(66)[6] D | Ac-PVA(66)[6] W |
|---|---|---|---|---|---|---|---|---|---|---|---|---|
| A B S | 1,240 | 26 | 1,000 | 56 | | | | | | | | |
| S D A | 1,070 | 5 | | | | | | | | | 1,070 | 14 |
| B N S | 1,620 | 27 | 1,410 | 200 | 1,540 | 73 | | | | | | |
| Sodium resinate | 1,620 | 140 | 1,700 | 160 | | | 1,400 | 160 | 1,580 | 45 | 1,730 | 100 |
| Sodium oleate | 780 | 73 | 940 | 120 | | | | | | | 1,000 | 56 |

[1] PVB: Deg. of acetalization 62%, PD (polymerization degree) 1,100.
[2] PVAcl: Deg. of acetalization 32%, PD 1,100.
[3] PVF: Deg. of acetalization 87%, PD 900.
[4] PVAc: PD 1,100.
[5] Ac-PVA (87): Deg. of acetalization 87%, PD 1,100.
[6] Ac-PVA (66): Deg. of acetalization 66%, PD 1,100.

NOTE: Strength of paper: 1,800 (D) and 400 (W).

DESCRIPTION OF THE PREFERRED EMBODIMENTS

The present invention is illustrated by the following examples.

Example 1

A solution of 0.3 g., calculated as the solids, of a water-solubilized high molecular weight compound prepared by dissolving a water-insoluble high molecular weight polyvinyl compound selected from the group consisting of polyvinyl butyral (referred to as PVB), polyvinyl acetoacetal (PVAcl), polyvinyl formal (PVF) and a partially acetylated polyvinyl alcohol (Ac-PVA) in an aqueous solution of an anionic surface active agent selected from the group consisting of sodium dodecylbenzenesulfonate (ABS), sodium dodecyl sulfate (SDS), sodium butylnaphthalenesulfonate (BNS), sodium resinate and sodium oleate was uniformly applied to a single surface of a piece of kraft paper of 15 cm. × 15 cm., and to said surface was stuck a ceramic tile of 25 mm. × 25 mm. × 3.5 mm. thickness and a weight of 5.6 g., thus obtaining a papered tile. After drying at about 35°C. for 40 minutes, the bonding strength between the tile and the paper of one specimen of the obtained papered tile was determined by reading the force (g) required for separating them. On the other hand, 4 minutes after rewetting of the paper surface of another specimen of the above papered tile at room temperature, the bonding strength between the tile and paper was determined in the same manner as in the above determination of the bonding strength in the dry state.

The compositions of the high molecular weight compound and the surface active agent in the tested water-solubilized high molecular weight compounds are shown in the Table 1 and the bonding strengths in dry state and in wet state are shown in the Table 2.

For comparison, the bonding strengths in the dry and wet states by using as adhesive a PVA of a polymerization degree 1,700, a blue, a corn starch and compositions of PVA of a polymerization degree 500 and 2,000 with SDS, respectively, were tested. The results are given in Table 3 and 4.

TABLE 3

Bonding strength (g) in dry state (D) and in wet state (W)

| Adhesives | D | W |
|---|---|---|
| PVA | 2600 | * |
| Glue | 2080 | * |
| Corn starch | 1100 | 400 |

Note: *In the cases of PVA and glue, the bonding strength in wet state was greater than that of paper so that paper was broken.

TABLE 4

Bonding strength (g) in dry state (D) and in wet state (W)

| Adhesives | D | W |
|---|---|---|
| PVA (PD 500) + SDS | 124 | 50 |
| PVA (PD 2,000) + SDS | 45 | 20 |

It will be noticed by comparison of the Tables 2, 3 and 4 that only the adhesives according to the present invention exhibit a greater difference between the bonding strength in the dry state and that in the wet state. Although the values shown in Table 2 were the values obtained a relatively short time after the manufacture of the papered tiles, the bonding strengths were of substantially the same values even after 3 months. Even after exposure to strong ultraviolet rays for several hours, the bonding strengths were at least 90 percent of the initial values. During storage at 30°C. or 80°C. for 3 months, there was observed no deterioration caused by bacteria.

Example 2

A water-solubilized high molecular weight compound, obtained by dissolving a commercially available PVAc emulsion of a solids content of 50 percent in an aqueous solution of sodium resinate, was uniformly applied to a single surface of a piece of kraft paper of 30 cm. × 30 cm. in a weight of 0.5 g. solids per piece of paper, and dried at 50°C. for 1 hour. The coated surface of the so treated paper was wetted in accordance with JIS Z 0218–1960 and there was stuck thereon a tile as used in Example 1.

The procedure was as follows: The coated surface on which the adhesive had been applied was wetted with water by means of pressing the surface upon a sponge having a thickness of 10 mm. and a surface of 400 mm. × 400 mmx., the under surface of which was immersed in water. The pressure of the pressing was 25 g./cm.$^2$, and the time for the pressing was 1.5 seconds. At 15 seconds after wetting, the paper was placed on the complementary (tile) material, and the two materials were pressed together by means of a roller weighing 8 kg., and having a diameter of 113 mm. and a width of 10 mm. and having a sponge rubber layer 6 mm. thick disposed around the periphery of the roll.

Thereafter, the bonding strengths in dry and wet states were determined in the same manner as in Example 1. The results obtained are shown in Table 5.

TABLE 5

Bonding strength (g) in dry state (D) and in wet state (W)

| Water-solubilized high molecular weight compound | | Bonding strength (g) | |
|---|---|---|---|
| PVAc*(%) | Sodium resinate (%) | D | W |
| 20 | 0 | 1600 | ** |
| 12 | 8 | 1350 | 300 |
| 8 | 12 | 1400 | 300 |
| 4 | 16 | 1400 | 160 |

Note: 1. Strength of paper: 1800 (D) and 400 (W)
2. * PD 1,100
** Paper was broken Table 5 shows that the bonding strength differs to a great extent in the dry state and in the wet state, when the adhesives were used according to the present invention.

For comparison, similar tests were made by using as an adhesive a PVA of a PD 1,400 and potato starch, respectively, and the results are given in Table 6.

TABLE 6

Bonding strength (g) in dry state (D) and in wet state (W)

| Adhesive | D | W |
|---|---|---|
| PVA | 1250 | * |
| Potato starch | 700 | * |

Note: *Paper was broken since the bonding strength in wet state was greater than the strength of paper, that is to say, there was no difference in bonding strength between the dry state and the wet state.

Example 3

A solution of 8 mg., calculated as solids, of a water-solubilized high molecular weight compound prepared in the same manner as in Example 1 was applied to a 2 cm. × 4 cm. of a Toray Acetate sliding-door paper, the paper was stuck on a cedar board surface and the bonding strengths in the dry state and in the wet state therebetween were determined in the same manner as in Example 1. The strengths of the Toray Acetate sliding-door paper in the dry state and in the wet state were 1000 g. and 400 g., respectively. The compositions of the water-solubilized high molecular compounds were the same as in Example 1. The results are given in Table 7, together with the comparative results obtained when potato starch and PVA were used as controls.

TABLE 7

Bonding strength to cedar board (g)

| Agents | PVB | | PVAc | | PVF | | PVA | | Starch | |
|---|---|---|---|---|---|---|---|---|---|---|
|  | D | W | D | W | D | W | D | W | D | W |
| B N S | 1000 | 30 | 800 | 187 | 1000 | 187 |  |  |  |  |
| Sodium resinate | 780 | 54 |  |  |  |  |  |  |  |  |
| None |  |  |  |  |  |  | 1000 | * | 900 | * |

Note: *Paper was broken

Example 4

A polished steel plate and kraft paper were pasted together by using as an adhesive a water-solubilized high molecular weight compound prepared in the same manner as in Example 1, and the bonding strengths in the dry state and in the wet state were determined. The results obtained are shown in Table 8, together with the comparative result obtained when potato starch was used as a control.

TABLE 8

Bonding strength (g) to steel plate

| Surface Active agents | PVB | | PVAcl | | Ac-PVA(87) | | Starch | |
|---|---|---|---|---|---|---|---|---|
|  | D | W | D | W | D | W | D | W |
| A B S | 678 | 12 |  |  |  |  |  |  |
| B N S | 1000 | 75 |  |  | 948 | 80 |  |  |
| Sodium resinate | 960 | 260 |  |  | 750 | 54 |  |  |
| None |  |  |  |  |  |  | 560 | 350 |

Example 5

A commercially available laminated board, "Decora" (manufactured by Sumitomo Bakelite Co., Japan and consisting of a phenolic resin core and a melamine resin surface), was pasted with a kraft paper by using a water-solubilized high molecular weight compound prepared in the manner as described in Example 1, and the bonding strengths therebetween in the dry state and in the wet state were determined. The results are given in Table 9.

TABLE 9

Bonding strength (g) to Decora board

| Surface active agents | PVB | | PVAc | | Ac-PVA(66) | | PVA | |
|---|---|---|---|---|---|---|---|---|
|  | D | W | D | W | D | W | D | W |
| B N S | 984 | 144 |  |  |  |  |  |  |
| Sodium resinate |  |  | 780 | 56 | 910 | 95 |  |  |
| None |  |  |  |  |  |  | 700 | * |

Note: *paper was torn

Example 6

A copolymer emulsion (polymerization degree of about 2,000) of VAc and ethyl acrylate in the ratio of 1 : 1 was prepared by using a copolymer compound (polymerization degree of 800) of vinyl methyl ether and maleic anhydride as a protective colloid. A water-solubilized high molecular weight compound was prepared by dissolving the above copolymer emulsion in an aqueous solution of sodium resinate in the ratio by weight, calculated as solids, of the former : the latter of 6 : 14. 0.1 g., calculated as solids, of a 20 percent aqueous solution of this water-solubilized high molecular weight compound, was uniformly applied to one surface of a piece of kraft paper of 10 cm. × 10 cm., and to said surface was stuck a tile of 25 mm. × 25 mm., 3.5 mm. thickness and a weight of 2.6 g., thus obtaining a papered tile. After drying in the same manner as in Example 1, the bonding strengths between the tile and the paper in the dry state and in the wet state were determined to be 2,400 g. in the dry state and 90 g. in the wet state, respectively.

On the other hand, 0.1 g., calculated as the solids, of the above copolymer emulsion, was applied to a one surface of the same kraft paper in the same manner as above and to said surface was stuck the same size and kind of tile. The bonding strengths were 2,400 g. in the dry state, but the strength in the wet state was stronger than the strength of paper, and, therefore, the paper could not be separated from the tile without rupture. Further, the strengths in the dry state and in the wet state of the paper itself were 2,400 g. and 500 g., respectively.

The embodiments of the invention in which an exclusive property or privilege is claimed are defined as follows:

1. An article of manufacture comprising two materials adhesively bonded to each other by a moisture sensitive bonding composition, at least one material being composed of moisture permeable sheet material and said bonding composition consisting of one part water-insoluble high molecular weight polyvinyl adhesive compound selected from the group consisting of polyvinyl acetate and its partial saponification products, partially acetylated polyvinyl alcohol, graft copolymers of polyvinyl alcohol with vinyl acetate, copolymers of vinyl acetate with a copolymerizable monomer and polyvinyl acetals, and 0.1 to 10 parts anionic surface active agent selected from the group consisting of carboxyl-containing surface active agents, alkyl sulfates, alkylarylsulfonates and alkylsulfonates, the two materials of said article being adapted to be separated from each other by the application of moisture through said moisture permeable sheet material whereby the bonding strength of said moisture sensitive composition is reduced.

2. An article of manufacture according to claim 1, in which the bonding composition is applied at the rate of 1 to 50 grams, calculated as the solids, per 1 $m^2$ of the sheet material.

3. An article of manufacture according to claim 1, in which one of the two materials is paper and the other material comprises ceramic tile pieces.

4. The process of adhesively attaching together two materials which comprises applying to one surface of a first sheet material a coating of an adhesive composition consisting essentially of an aqueous solution of (1) a water-insoluble high molecular weight polyvinyl compound selected from the group consisting of polyvinyl acetate and its partial saponification products, partially acetylated polyvinyl alcohol, graft copolymers of vinyl acetate with a copolymerizable monomer and polyvinyl acetals, said polyvinyl compound being water-solubilized by (2) an anionic surface active agent selected from the group consisting of carboxyl-containing surface active agents, alkyl sulfates, alkylarylsulfonates and alkylsulfonates, the ratio of said poly-vinyl compound to said surface active agent being in the range of from 10 : 100 to 100 : 10 parts by weight; applying said first coated sheet material, while said coating is wet with water, to a second material in bonding relationship by pressing the two materials together; and then drying said adhesive composition in order to adhere the two materials together.

5. The process of claim 4, in which the coating on the first material is dried and is remoistened prior to being applied to the second material.

6. The process of claim 4, in which the first material is applied to the second material before the coating on the first material has dried.

7. A process according to claim 4, including the further step of separating the two materials by applying water to said adhesive composition to reduce the bonding strength of said adhesive composition to said materials.

8. The method of claim 4, wherein one of the two materials is a paper material upon which is applied the said adhesive composition, and the other material comprises ceramic tile pieces.

9. The method of claim 4, in which one of the two materials is a porous sheet material, adapted to admit of alternatively drying and moistening of said adhesive composition.

* * * * *